(12) United States Patent
Wodak et al.

(10) Patent No.: US 11,826,935 B2
(45) Date of Patent: Nov. 28, 2023

(54) METHOD FOR PRODUCING A LENS ELEMENT

(71) Applicant: Docter Optics SE, Neustadt an der Orla (DE)

(72) Inventors: Horst Wodak, Nuremberg (DE); Hans-Jürgen Brandt, Neustadt an der Orla (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 0 days.

(21) Appl. No.: 16/980,665

(22) PCT Filed: Mar. 18, 2019

(86) PCT No.: PCT/DE2019/100249
§ 371 (c)(1),
(2) Date: Sep. 14, 2020

(87) PCT Pub. No.: WO2019/179571
PCT Pub. Date: Sep. 26, 2019

(65) Prior Publication Data
US 2021/0023754 A1    Jan. 28, 2021

(30) Foreign Application Priority Data

Mar. 20, 2018   (DE) .................... 10 2018 002 267.7
Jan. 31, 2019   (DE) .................... 10 2019 102 521.4
Feb. 28, 2019   (DE) .................... 10 2019 105 071.5

(51) Int. Cl.
*B29C 45/16*    (2006.01)
*B29C 45/27*    (2006.01)
(Continued)

(52) U.S. Cl.
CPC ...... *B29C 45/1618* (2013.01); *B29C 45/2701* (2013.01); *B29C 45/7207* (2013.01); *B29L 2011/0016* (2013.01); *B29L 2031/30* (2013.01)

(58) Field of Classification Search
CPC ............ B29C 45/1618; B29C 45/2701; B29C 2011/0016
See application file for complete search history.

(56) References Cited

U.S. PATENT DOCUMENTS

| | | | |
|---|---|---|---|
| 821,610 A | 5/1906 | Cox | |
| 4,666,496 A | 5/1987 | Fecik | |

(Continued)

FOREIGN PATENT DOCUMENTS

| | | | |
|---|---|---|---|
| CN | 205049796 U | * | 2/2016 |
| CN | 105819674 | | 8/2016 |

(Continued)

OTHER PUBLICATIONS

Machine translation CN205049796U (Year: 2016).*

(Continued)

*Primary Examiner* — Matthew J Daniels
*Assistant Examiner* — Wayne K. Swier
(74) *Attorney, Agent, or Firm* — DUANE MORRIS LLP

(57) ABSTRACT

The invention relates to a method for producing a lens element (2), in particular for illumination purposes, in particular for producing a headlight lens (2) for a vehicle headlight, in particular for a motor vehicle headlight (1).

13 Claims, 11 Drawing Sheets

(51) Int. Cl.
    B29C 45/72     (2006.01)
    B29L 11/00     (2006.01)
    B29L 31/30     (2006.01)

(56) References Cited

U.S. PATENT DOCUMENTS

| | | | |
|---|---|---|---|
| 5,120,343 | A | 6/1992 | Monji et al. |
| 6,130,777 | A | 10/2000 | Yamashita et al. |
| 7,798,688 | B2 | 9/2010 | Hamkens |
| 9,360,666 | B2* | 6/2016 | Kikuchi ............... G02B 1/041 |
| 2001/0033726 | A1 | 10/2001 | Shie et al. |
| 2002/0153624 | A1 | 10/2002 | Tumlin et al. |
| 2003/0001301 | A1 | 1/2003 | Duroux et al. |
| 2004/0244421 | A1 | 12/2004 | Kato et al. |
| 2005/0054514 | A1 | 3/2005 | Ishioka et al. |
| 2009/0323502 | A1 | 12/2009 | Murata et al. |
| 2010/0246008 | A1 | 9/2010 | Murata et al. |
| 2011/0266576 | A1 | 11/2011 | Engl et al. |
| 2012/0040044 | A1 | 2/2012 | Jehira et al. |
| 2013/0221551 | A1 | 8/2013 | Genda |
| 2014/0332991 | A1* | 11/2014 | Giessauf ............. B29C 45/7207 264/1.7 |
| 2015/0224723 | A1 | 8/2015 | Hamkens |
| 2017/0327402 | A1 | 11/2017 | Fujii |
| 2018/0251395 | A1 | 9/2018 | Akiba et al. |
| 2018/0328558 | A1 | 11/2018 | Okubo |
| 2019/0041556 | A1 | 2/2019 | Iwata |
| 2020/0195823 | A1 | 6/2020 | Furutake |
| 2022/0373151 | A1 | 11/2022 | Zhang et al. |

FOREIGN PATENT DOCUMENTS

| | | | | |
|---|---|---|---|---|
| DE | 099 964 | | 2/1961 | |
| DE | 2906858 | | 9/1980 | |
| DE | 36 02 262 | | 5/1987 | |
| DE | 3809969 | A * | 10/1989 | ............. B29C 45/14 |
| DE | 299 14 114 | | 11/1999 | |
| DE | 69701714 | | 2/2001 | |
| DE | 102 26 471 | | 1/2004 | |
| DE | 10 2005 009 556 | | 9/2005 | |
| DE | 10 2008 034153 | | 1/2010 | |
| DE | 102008054029 | | 5/2010 | |
| DE | 102012205196 | A1 * | 10/2013 | ........... B29C 45/162 |
| DE | 20 2014 100462 | | 3/2014 | |
| DE | 10 2015 001609 | | 8/2016 | |
| DE | 102015001609 | A1 * | 8/2016 | |
| DE | 10 2015 007 832 | | 12/2016 | |
| DE | 10 2017 105 888 | | 9/2018 | |
| DE | 10 2015 012 324 | | 6/2019 | |
| DE | 10 2020 115078 | | 1/2021 | |
| EP | 1785255 | A1 * | 5/2007 | ............. B29C 45/16 |
| EP | 2402140 | | 1/2012 | |
| EP | 2666620 | | 11/2013 | |
| EP | 3312501 | | 4/2018 | |
| EP | 3520983 | | 8/2019 | |
| EP | 3575362 | | 12/2019 | |
| JP | 01072822 | | 3/1989 | |
| JP | H06-286754 | | 10/1994 | |
| JP | H07330347 | A | 12/1995 | |
| JP | 2002160256 | | 6/2002 | |
| JP | 2006062359 | | 3/2006 | |
| JP | 2010046895 | | 3/2010 | |
| JP | 2018118900 | | 8/2018 | |
| JP | 2019135202 | | 8/2019 | |
| KR | 20160028901 | | 3/2016 | |
| WO | 2004/096724 | | 11/2004 | |
| WO | 2009/036739 | | 3/2009 | |
| WO | 2009/109209 | | 9/2009 | |
| WO | 2012072192 | | 6/2012 | |
| WO | 2014/161014 | | 10/2014 | |
| WO | 2017/207079 | | 12/2017 | |
| WO | 2019/072326 | | 4/2019 | |
| WO | 2019/179571 | | 9/2019 | |
| WO | 2021008647 | | 1/2021 | |
| WO | 2021008657 | | 1/2021 | |

OTHER PUBLICATIONS

Machine translation DE102015001609A1 (Year: 2016).*
Machine translation DE102012205196A1 (Year: 2013).*
Machine translation DE3809969A1 (Year: 1989).*
Machine translation JP2006062359A (Year: 2006).*
Machine translation EP1785255A1 (Year: 2007).*
International Search Report and Written Opinion dated May 20, 2019 For Corresponding PCT Application No. PCT/DE2019/100249.
German Office Action dated Jul. 13, 2021 In Corresponding German Application No. DE 10 2020 127 638.9.
International Preliminary Report on Patentability dated Jan. 18, 2022 In Corresponding PCT Application No. PCT/DE2020/100478.
International Search Report and Written Opinion dated Sep. 16, 2020 In Corresponding PCT Application No. PCT/DE2020/100478.
Office Action dated Mar. 20, 2020 For Corresponding Patent Application No. DE 10 2019 119 040.1.
Office Action dated Feb. 19, 2020 For Corresponding Patent Application No. DE 10 2019 119 042.8.
International Preliminary Report on Patentability dated Jan. 18, 2022 In Corresponding PCT Application No. PCT/DE2020/100609.
International Search Report and Written Opinion dated Oct. 16, 2020 In Corresponding PCT Application No. PCT/DE2020/100609.
International Preliminary Report on Patentability dated Sep. 22, 2020 in corresponding PCT Application No. PCT/DE2019/100249.
International Search Report and Written Opinion dated May 6, 2021 For PCT/DE2021/100035.
International Preliminary Report on Patentability dated Jul. 19, 2022 For Corresponding PCT Application No. PCT/DE2021/100035.
International Search Report and Written Opinion dated May 25, 2021 for PCT/DE2021/100136.
International Search Report and Written Opinion dated Apr. 8, 2021 For Corresponding Patent Application No. PCT/DE2020/101007.
International Preliminary Report on Patentability dated May 17, 22 for Corresponding Patent Application No. PCT/DE2020/101007.
International Search Report and Written Opinion dated Jan. 26, 2021 for Corresponding Patent Application No. PCT/DE2020/100860.
International Preliminary Report on Patentability dated Apr. 12, 2022 for Corresponding Patent Application No. PCT/DE2020/100860.
Search Report dated Nov. 22, 2021 For Corresponding Patent Application No. DE 10 2021 105 560.1.
International Preliminary Report on Patentability Issued in Corresponding PCT Application No. PCT/DE2021/100136 dated Aug. 23, 2022.
International Search Report and Written Opinion dated Feb. 1, 2022 for Corresponding PCT Application No. PCT/DE2021/100858.
Audi—Vorsprung durch Technik, http://web.archive.org/web/20150109234745/http://www.audi.de/content/de/brand/de/vorsprung_durch_technik/content/2013/08/Audi-A8-erstrahlt-in-ne, May 22, 2023.
Vehicle Bodies, Bosch Automotive Handbook, 9th Edition, 2014, p. 1040.
Digital Light: Millions of Pixels on the Road, https://www.al-lighting.com/news/article/digital-light-millions-of-pixels- Oct. 31, 2018.
Hella bringt neues SSL-HD-Matrix-Lichtsystem auf den Markt, https://www.springerprofessional.de/fahrzeug-lichttechnik/fahrzeugsicherheit/hella-bringt-neues-ssl-hd-matrix-lichtsystem-auf-den-markt/17182758, Sep. 18, 2019.
von Alfred Vollmer,"Matrix-LED- und Laserlicht bietet viele Vorteile", https://www.all-electronics.de/automotive-transportation/matrix-led-und-laserlicht-bietet-viele-vorteile.html, Apr. 15, 2014.
SSL|HD: hochintegriertes HD-LED-Lichtsystem von Hella, https://www.highlight-web.de/5874/hella-ssl-hd/, Sep. 13, 2019.
Hopmann, Christian et al., "Technologie des Spritzgießens" Lern- und Arbeitsbuch, 2017, pp. 19, 29, 57-59, 64-70.
Unser Digital Light SSL | HD-Lichtsystem: ein neuer Meilenstein der automobilen Lichttechnik | HELLA, https://www.hella.com/techworld/de/Lounge/Unser-Digital-Light-SSL-HD-Lichtsystem-ein-neuer-Meilenstein-der-automobilen-Lichttechnik-55548/, 11 pages.

(56) References Cited

OTHER PUBLICATIONS

International Preliminary Report on Patentability dated May 8, 2023 for PCT/DE2021/100858.
International Search Report and Written Opinion dated Feb. 4, 2022 for Corresponding PCT Application No. PCT/DE2021/100840.

* cited by examiner

METHOD FOR PRODUCING A LENS ELEMENT

FIELD OF THE INVENTION

The invention relates to a method of producing an (optical) (automotive) lens element, for example for illumination purposes, for example to a method of producing a headlight lens for a vehicle headlight, for example for a motor vehicle headlight.

BACKGROUND

DE 10 2007 037 204 A1 discloses a method of producing an optical lens element, for example for illumination purposes, for example of producing a headlight lens for a vehicle headlight, for example for a motor vehicle headlight, wherein a blank composed of a transparent, for example thermoplastic, for example substantially liquid polymer is molded, for example by an injection press method in an injection press mold, and wherein the blank is then pressed to form the lens element, for example in a polished manner, using a final contour mold.

WO 2014/161014 A1 and U.S. Pat. No. 10,183,429 B2 (incorporated by reference in its entirety) disclose a method of producing an injection-molded part, for example an optical element, wherein an injection-molding material is cast in at least two injection-molding stations using at least two injection-molding processes, wherein a preform produced in one of the at least two injection-molding processes is cooled in a cooling station between the at least two injection-molding processes. According to WO 2014/161014 A1, it is known from AT 505 321 A1 to injection mold the injection-molded part to be produced in multiple layers or steps in the injection molding of optical elements (e.g. lenses). On the one hand, improved contour accuracy is obtained due to compensation of sink marks in a previously injection molded layer, and on the other hand a reduction of the necessary mold opening pressure is obtained. Furthermore, a shorter cycle time is obtained since the cooling time increases quadratically with the wall thickness of the injection-molded layer. This is explained e.g. in WO 2012/069590 A1. The sum of the cooling times in multi-layer injection molding is therefore lower than in one-piece injection molding. The cooling time is proportional to the square of the wall thickness, using a proportionality factor. Outer layers are only cooled on one side in contrast to the inner layer that was produced first in the mold. The cooling time of a layer being cooled on one side is approximately equal to the cooling time of a layer twice as thick being cooled on both sides. To achieve equal cooling times, an outer layer should have only half the wall thickness of the inner layer. For an injection-molded part built up in three layers with the total wall thickness s, therefore, a layer thickness distribution of s2=¼ s, s1=½ s, s3=¼ s would be expedient. (s2 and s3 denote the layer thicknesses of the outer layers, s1 the layer thickness of the inner layer). Further details can be taken from WO 2014/161014 A1.

It is desired to reduce the costs of producing lens elements, for example for illumination purposes, for example for the production of headlight lenses for vehicle headlights. It is for example an object of the invention to render the method according to WO 2014/161014 A1 usable on an industrial scale. In addition, a further reduced cycle time is desirable. The term "render usable on an industrial scale" is to be understood for example as meaning that a process is established which allows several thousand lens elements to be produced consecutively with a low reject rate without violating the stipulated quality standards or tolerances. This applies for example both to the geometric dimensions and in relation to the optical properties. For instance, headlight lenses are subject to strict design criteria in relation to their optical properties or lighting guide values. This applies for example with respect to a light-dark boundary, as shown by way of example in Bosch—Automotive Handbook, 9th edition, ISBN 978-1-119-03294-6, page 1040. Important lighting guide values here are the gradient G of the light-dark boundary and the glare value HV of the vehicle headlight in which the headlight lens is installed. An example of the full set of lighting values to be observed is disclosed e.g. in Bosch—Automotive Handbook, 9th edition, ISBN 978-1-119-03294-6, page 1040. Thus, for example, several thousand lenses have to be pressed with a low reject rate while maintaining the lighting properties. A low reject rate is to be understood as meaning for example a reject rate of no more than 10%, for example no more than 5%, and optionally no more than 2%.

SUMMARY

Provided is a method of producing an optical lens element, for example for illumination purposes, for example, producing a headlight lens for a vehicle headlight, such as for a motor vehicle headlight, wherein injection-molding material is injection molded using a first injection mold. The injection-molding material can be, for example, a transparent plastic liquefied by warming or heating, a iquid, transparent, amorphous, plastic or polymer.

DETAILED DESCRIPTION

Figure 1:
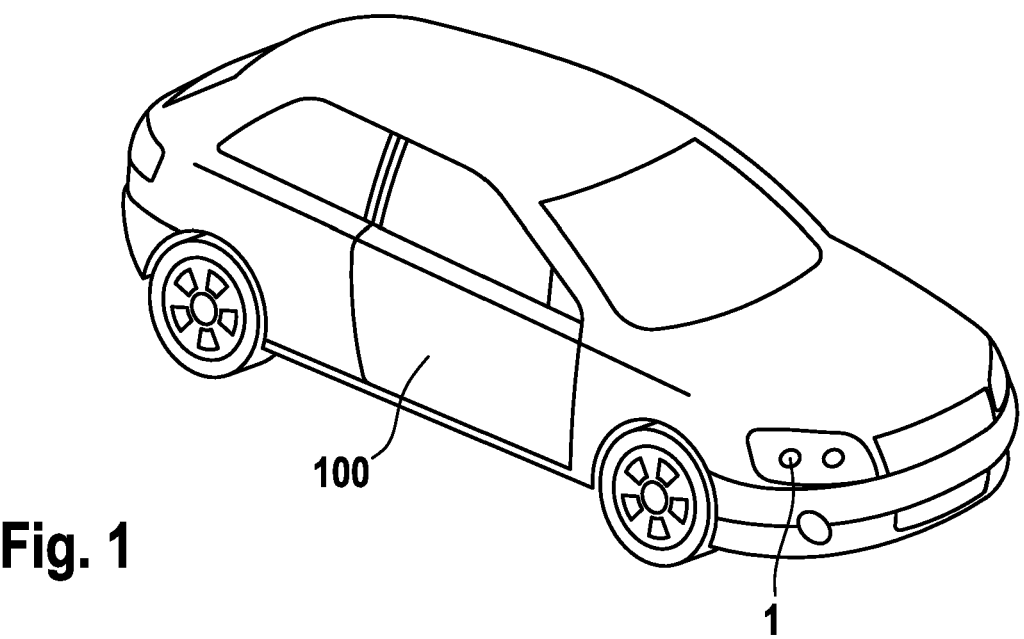
FIG. 1 shows an exemplary embodiment of a motor vehicle.

The present disclosure concerns a method of producing an optical lens element, for illumination purposes for example. In some embodiments, the method produces a lens for an automobile headlight, in another example the method produces a motor vehicle headlight, wherein an injection-molding material is injection molded using a first injection mold to form a pre-molded part, comprising at least one preform and at least first sprue/runner/gate connected to the preform. The injection-molding material can be, for example a transparent plastic liquefied by warming or heating, liquid, transparent, amorphous, plastic or polymer. The pre-molded part is then cooled outside the first injection mold, and wherein the pre-molded part is then injection molded and/or overmolded in a second injection mold to form an injection-molded part, comprising at least one automotive optical lens element and at least a second sprue/runner/gate or an overall sprue/runner/gate made up of the first sprue/runner/gate and the second sprue/runner/gate. In producing the optical lens elements, for example transparent plastics are processed. Examples of the transparent plastics are PC, PMMA, COC, COP and amorphous PA. Elastic materials, such as thermoplastic elastomers, can also be processed.

The term injection mold in the sense mentioned above is intended to denote for example a synonym of injection-molding cavity. In some embodiments, the first injection mold is part of a first injection-molding tool of a first injection-molding machine and the second injection mold is part of a second injection-molding tool, for example of a second injection-molding machine. However, it can also be provided that the first injection mold and the second injection mold are implemented in one injection-molding tool, for example also in one injection-molding machine. By way of example, reference should be made to the description relating to FIG. 14.

The total wall thickness (of the lens element) s ($s=s1+s2+s3$) has a layer thickness distribution for example, for example at $s=s_{max}$ (maximum total wall thickness), of 1.2(¼ s) s2 0.8(¼ s), 1.2(½ s) s1 0.8(½ s), 1.2(¼ s) s3 0.8(¼ s), where s2 and s3 denote the layer thicknesses of the outer layers, s1 the layer thickness of the inner layer or of the preform.

In an embodiment of the present disclosure, the optical lens element comprises an optically active lens body and a non-optically active rim, wherein the second sprue/runner/gate is connected directly to the optical lens body (and optionally not indirectly via the non-optically active rim).

In a further embodiment of the present disclosure, the second sprue/runner/gate runs at least in part along the first sprue/runner/gate (the first sprue/runner/gate and the second sprue/runner/gate being made in different steps and optionally forming a common sprue/runner/gate (=overall sprue/runner/gate) after curing). It is for example provided that the first sprue/runner/gate forms a partial wall of the cavity for the second sprue/runner/gate.

In a further embodiment of the present disclosure, the pre-molded part comprises at least a second preform, wherein the at least first sprue/runner/gate connects the first preform to the second preform.

In a further embodiment of the present disclosure, the injection-molded part comprises at least a second optical lens element, wherein the at least second sprue/runner/gate and/or the overall sprue/runner/gate connects the first optical lens element to the second optical lens element.

In a further embodiment of the present disclosure, the non-optically active rim is shaped only when the injection-molded part is injection molded.

In a further embodiment of the present disclosure, the injection-molded part is held only by the second sprue/runner/gate or the overall sprue/runner/gate during cooling.

In a further embodiment of the present disclosure, the major part of the second sprue/runner/gate runs along the first sprue/runner/gate.

In a further embodiment of the present disclosure, the pre-molded part is cooled in either a first cooling station or a second cooling station.

In a further embodiment of the present disclosure, the volume of the first sprue/runner/gate amounts to at least 30% of the pre-molded part.

In a further embodiment of the present disclosure, the volume of the second sprue/runner/gate amounts to at least 30% of the injection-molded part.

In a further embodiment of the present disclosure, the first sprue/runner/gate comprises a cross-sectional area of at least 25 mm$^2$ or of at least 40 mm$^2$.

In a further embodiment of the present disclosure, the second sprue/runner/gate comprises a cross-sectional area of at least 25 mm$^2$ or of at least 40 mm$^2$.

In a further embodiment of the present disclosure, the first optical (automotive) lens element is divided from the overall sprue/runner/gate.

In a further embodiment of the present disclosure, the at least second optical (automotive) lens element is divided from the overall sprue/runner/gate.

In a further embodiment of the present disclosure, it is provided that at least 16 lens elements and/or at least 16 preforms are pressed in a pressing step.

In a further embodiment of the present disclosure, it is provided that in a pressing step at least 8 injection-molded parts and/or at least 8 pre-molded parts, comprising a sprue/runner/gate and at least two lens blanks or preforms, are pressed in a step.

In a further embodiment of the present disclosure, it is provided that at least 32 lens elements and/or at least 32 preforms are pressed in a pressing step.

In a further embodiment of the present disclosure, it is provided that in a pressing step at least 16 injection-molded parts and/or at least 16 pre-molded parts, comprising a sprue/runner/gate and at least two lens blanks or preforms, are pressed in a step.

It is optionally provided that the ejection takes place on the optical surface or on a surface of a preform of a lens or of a pre-molded part (contact point of the ejector) where light transmission (relevant to the optical properties) is provided when operated as intended.

In an embodiment of the present disclosure, the pressing device comprises at least one hot runner. The hot runner or the major part of the hot runner optionally has a cross-sectional area of no less than 25 mm$^2$, optionally no less than 40 mm$^2$. The cross-sectional area of a hot runner within the meaning of this disclosure is for example a cross-sectional area orthogonal to the longitudinal direction of the hot runner or orthogonal to the direction of flow/average direction of flow of the liquid plastic in the hot runner.

It is also possible for e.g. at least two hot runners to be provided, a first hot runner and at least a second hot runner. It can be provided that the first hot runner is assigned to the first injection mold and the second hot runner to the second injection mold, or supplies or fills it with liquid plastic.

In a further embodiment of the present disclosure, a modular mold design is provided, having a basic mold and at least one mold set, an adapter mold, that is dependent on the injection-molded element and/or the preform. In a further embodiment of the invention, the sprue/runner/gate with its complex structures is assigned to the basic mold, whereas the injection-molded automotive lens elements themselves and the preforms are assigned to the adapter mold, which can also be called an insert mold. For example, a modular construction of the mold or tool is provided in such a way that the same hot runner is provided or used or employed for different lens molds.

In a further embodiment of the present disclosure, a pre-molded part or an injection-molded part remains in the tool or in the closed tool for 130 to 180 seconds or no more than 180 seconds. In a further embodiment of the present disclosure, this comprises both the time for the injection molding and the time for the holding pressure.

The above object is additionally achieved by a method of producing a vehicle headlight wherein an automotive optical lens element produced according to the above method is integrated into a headlight housing or installed in a headlight housing.

The above object is additionally achieved by a method of producing a vehicle headlight wherein an automotive optical lens element produced according to the above method is installed in a headlight housing together with at least one light source to form a vehicle headlight.

The above object is additionally achieved by a method of producing a vehicle headlight wherein an automotive optical lens element produced according to the above method is installed in a headlight housing together with at least one light source and a shield to form a vehicle headlight in such a way that an rim of the shield can be imaged by the automotive lens element as a light-dark boundary using light emitted by the light source.

The above object is additionally achieved by a method of producing a vehicle headlight wherein an optical lens element produced according to the above method is installed as a secondary lens in a headlight housing together with at least one primary optic to form a vehicle headlight in such a way that the primary optic can be imaged or is imaged by the automotive lens element. Particularly suitable primary optics are disclosed e.g. by U.S. Pat. No. 9,689,545, incorporated by reference herein in its entirety, U.S. Pat. No. 9,851,065, incorporated by reference hrein in its entirety, and DE 11 2017 000 180, incorporated by reference herein in its entirety.

The above object is additionally achieved by a method of producing a motor vehicle wherein a vehicle headlight produced according to the above method is installed in the front of the motor vehicle.

The above object is additionally achieved by a method of producing a motor vehicle wherein a vehicle headlight produced according to the above method is installed in the front of the motor vehicle in such a way that the rim of the shield can be imaged as a light-dark boundary on a road on which the motor vehicle can be arranged.

The above object is additionally achieved by a method of producing an optical lens element, for example for illumination purposes, for example of producing a headlight lens for a vehicle headlight, for example for a motor vehicle headlight, wherein a method having one or more of the method steps or features of WO 2014/161014 A1 is supplemented by one or more of the following features, wherein the term "preform" is used as in WO 2014/161014 A1 whereas the term "injection-molded part" is used, in a manner that deviates from WO 2014/161014 A1, for a lens body, including rim, or multiple lens bodies, including rim, including sprue/runner/gate (first sprue/runner/gate, further sprue/runner/gate, overall sprue/runner/gate):

(i) It is optionally provided that at least 16 lenses or preforms are pressed in a pressing step. It is for example provided that at least eight units, comprising a sprue/runner/gate and at least two lens blanks or preforms, are pressed in a step. It is optionally provided that at least 32 lenses or preforms are pressed in a pressing step. It is for example provided that at least 16 units, comprising a sprue/runner/gate and at least two lenses (lens blanks) or preforms, are pressed in a step.

(ii) The sprue/runner/gate (first sprue/runner/gate, further sprue/runner/gate, overall sprue/runner/gate) is optionally connected directly to the optical lens body and optionally not indirectly by way of the non-optically active rim.

(iii) The sprue/runner/gate (first sprue/runner/gate, further sprue/runner/gate, overall sprue/runner/gate) remains on the preform or on the automotive lens element after demolding. The sprue/runner/gate (first sprue/runner/gate, further sprue/runner/gate, overall sprue/runner/gate) is optionally separated off only after completion of molding and thus after demolding of the injection-molded part.

(iv) It is optionally provided that the ejection takes place on the optical surface or on a surface of a preform of a lens or of a pre-molded part (contact point of the ejector) where light transmission (relevant to the optical properties) is provided when operated as intended. Contrary to expectations, this increases the process stability without a negative effect on the optical properties.

(v) At least two preforms are injection-pressed or injection-molded with one sprue/runner/gate (first sprue/runner/gate, further sprue/runner/gate, overall sprue/runner/gate).

(vi) Shaping of the rim, wherein the rim is to be understood as the part of the lens to which no optical function is allocated: the rim is not produced in the first injection-pressing step. The rim is produced in the second injection-pressing step or in the last injection-pressing step.

(vii) The handling and/or the alignment of the preform in the mold for injection pressing the injection-molded part takes place using the sprue/runner/gate (first sprue/runner/gate, further sprue/runner/gate, overall sprue/runner/gate).

(viii) The second sprue/runner/gate runs at least in part along the first sprue/runner/gate.

(ix) The sprue/runner/gate is relatively thick. The volume of the sprue/runner/gate (first sprue/runner/gate, further sprue/runner/gate, overall sprue/runner/gate) corresponds to at least 30% of the volume of the pre-molded part or of the injection-molded part.

(x) Two or more preforms or lens elements (injection-molded elements) are assigned to a sprue/runner/gate (first sprue/runner/gate, further sprue/runner/gate, overall sprue/runner/gate).

(xi) In an embodiment of the invention, the pressing device comprises at least one hot runner. The hot runner or the major part of the hot runner optionally has a cross-sectional area of no less than 25 mm², optionally no less than 40 mm². The cross-sectional area of a hot runner within the meaning of this disclosure is for example a cross-sectional area orthogonal to the longitudinal direction of the hot runner or orthogonal to the direction of flow/average direction of flow of the liquid plastic in the hot runner.

(xii) A modular mold design is provided, comprising a basic mold and at least one mold set (adapter mold) which is dependent on the injection-molded element and/or the preform. The sprue/runner/gate (first sprue/runner/gate, further sprue/runner/gate, overall sprue/runner/gate) with its complex structures is assigned to the basic mold, whereas the (automotive) lens elements (injection-molded elements) and the preforms are assigned to the adapter mold (which can also be referred to as an insert mold). For example, a modular construction of the mold or tool is provided such that the same hot runner is provided or used or employed for various lens molds.

(xiii) In addition to the cooling station, a store for pre-molded parts is provided. The handling robot can remove pre-molded parts together with sprue/runner/gate either from the cooling station or from the (additional) store. Thus, for example two, for example different, types of cooling stations are provided.

(xiv) The pre-molded parts in the additional store are kept heated or are heated before insertion in the mold for injection pressing the injection-molded part.

(xv) The preforms or preform parts are not laid down on an optical surface immediately after injection pressing or removal from the tool for pressing the preform. It is for example provided that the pre-molded parts or the injection-molded parts are laid down or held by the sprue/runner/gate (first sprue/runner/gate, further sprue/runner/gate, overall sprue/runner/gate).

(xvi) The sprue/runner/gate (first sprue/runner/gate, further sprue/runner/gate, overall sprue/runner/gate) is used for alignment, wherein a series of contact surfaces or extensions or blind extensions or appendices, which branch off the actual sprue/runner/gate, can be provided. In one embodiment, the sprue/runner/gate (first sprue/runner/gate, further sprue/runner/gate, overall sprue/runner/gate) additionally contains centering pins. In one embodiment, the sprue/runner/gate (first sprue/runner/gate, further sprue/runner/gate, overall sprue/runner/gate) has at least two mandrels for aligning the sprue/runner/gate (first sprue/runner/gate, further sprue/runner/gate, overall sprue/runner/gate) and thus the preform part in the injection press mold for the injection pressing of the injection-molded part.

(xvii) The sprue/runner/gate (first sprue/runner/gate, further sprue/runner/gate, overall sprue/runner/gate) optionally has a cross-sectional area of no less than 25 mm², optionally no less than 40 mm². The sprue/runner/gate (first sprue/runner/gate, further sprue/runner/gate, overall sprue/runner/gate) optionally has a cross-sectional area of no less than 25 mm², optionally no less than 40 mm², over a significant proportion. The sprue/runner/gate (first sprue/runner/gate, further sprue/runner/gate, overall sprue/runner/gate) optionally has a cross-sectional area of no less than 25 mm², optionally no less than 40 mm², with respect to the major or greatest part of its length. The cross-sectional area of a sprue/runner/gate (first sprue/runner/gate, further sprue/runner/gate, overall sprue/runner/gate) within the meaning of this disclosure is for example a cross-sectional area orthogonal to the longitudinal direction of the sprue/runner/gate (first sprue/runner/gate, further sprue/runner/gate, overall sprue/runner/gate) or orthogonal to the direction of flow/average direction of flow of the liquid plastic in the sprue/runner/gate (first sprue/runner/gate, further sprue/runner/gate, overall sprue/runner/gate).

(xviii) A pre-molded part or an injection-molded part optionally remains in the tool or in the closed tool for 130 to 180 seconds or no more than 180 seconds. This comprises both the time for the injection molding and the time for the holding pressure.

It is provided here, for example, that at least 2, at least 3, at least 4, at least 5, at least 6, at least 7, at least 8, at least 9, at least 10, at least 11, at least 12, at least 13, at least 14, at least 15, at least 16 or at least 17 of the features (i) to (xviii) are used.

An optical lens element within the meaning of this disclosure is for example a headlight lens. An optical lens element within the meaning of this disclosure is for example a headlight lens for imaging a light-dark boundary on a road. An optical lens element within the meaning of this disclosure is for example a focusing lens. A finished pressed lens (or lens element) within the meaning of this disclosure is for example a lens (or a lens element) that possesses a volume of at least 50 cm³ without a sprue/runner/gate. For example, the following terminology is used: a pre-molded part comprises at least one sprue/runner/gate and at least one preform. A pre-molded part can also comprise a sprue/runner/gate with two or more preforms. An injection-molded part comprises at least one sprue/runner/gate and at least one lens element or at least one sprue/runner/gate and at least one lens. A lens element or a lens comprises a lens body and possibly a lens rim or an rim. The lens element can be automotive lens element.

Injection molding can be carried out with a pressure of 800 bar to 1000 bar.

In a further embodiment of this disclosure, in the second or last pressing step a light-diffusing surface structure is molded into an optically active surface of the lens element. A suitable light-diffusing surface structure comprises e.g. a modulation and/or a (surface) roughness of at least 0.05 µm, for example at least 0.08 µm, or is designed as a modulation optionally with a (surface) roughness of at least 0.05 µm, for example at least 0.08 µm. Roughness within the meaning of this disclosure is intended to be defined for example as Ra, for example in accordance with ISO 4287. In a further embodiment of this disclosure, the light-diffusing surface structure can comprise a structure resembling a golf ball surface or can be designed as a structure resembling a golf ball surface. Suitable light-diffusing surface structures are disclosed e.g. in DE 10 2005 009 556, DE 102 26 471 B4 and DE 299 14 1 14 U1. Further embodiments of light-diffusing surface structures that can be used are disclosed in the German patent specification 1 099 964, DE 36 02 262 C2, DE 40 31 352 A1, U.S. Pat. No. 6,130,777, US 2001/0033726 A1, JP 10123307 A, JP 09159810 A, WO 2018/177757 A1 and JP 01147403 A.

The above object can be additionally achieved by a vehicle headlight having at least one light source, wherein the vehicle headlight has a headlight lens produced by a method described above. In a further embodiment of the invention, the vehicle headlight comprises a shield, wherein an rim of the shield can be imaged as a light-dark boundary by the headlight lens or part of the headlight lens.

The above object can be additionally achieved by a motor vehicle having a vehicle headlight as mentioned above, wherein it is for example provided that the light-dark boundary can be imaged on a road on which the motor vehicle can be arranged.

A sprue/runner/gate is to be understood in this disclosure for example as the part of a pre-molded part or of an injection-molded part that does not belong to the subsequent lens element. The sprue/runner/gate within the meaning of this disclosure arises for example from the plastic (melt) that has set in the feed channels to the casting mold. It is for example provided that the sprue/runner/gate within the meaning of this disclosure is a part whose volume does not contribute to the volume of the "useful part", i.e. the volume of the lens element.

A motor vehicle within the meaning of the disclosure is for example a land vehicle for individual use in road transport. Motor vehicles within the meaning of the disclosure are for example not limited to land vehicles with an internal combustion engine.

The disclosed method is particularly suitable for lenses with a surface that is curved on both sides, i.e. for lenses in which both the light entry surface and the light exit surface are curved. The method is particularly suitable for lenses that have a convex curvature on the light entry side and on the light exit side. The described method is particularly suitable for lenses as disclosed in U.S. Pat. No. 9,506,614 B2 (incorporated by reference in its entirety).

Figure 2:
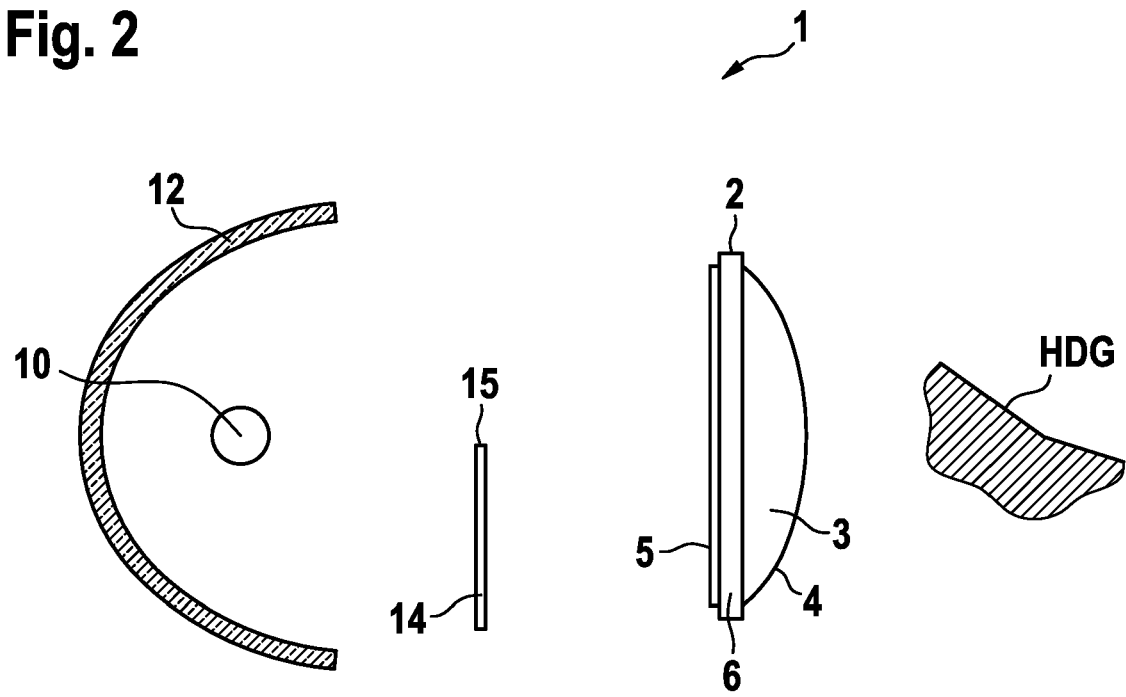
FIG. 2 shows a schematic diagram of an exemplary vehicle headlight.

FIG. 1 shows a motor vehicle 100 with a vehicle headlight 1 illustrated schematically in FIG. 2 with a light source 10 for generating light arranged in a headlight housing (not shown), a reflector 12 for reflecting light that can be generated by the light source 10 and a shield 14 that can be arranged in the headlight housing (not shown). The vehicle headlight 1 additionally comprises a headlight lens 2 arranged in the headlight housing (not shown) for changing the beam direction of light that can be generated by the light source 10 and for example for imaging an edge, labelled in FIG. 2 with reference number 15, of the shield 14 as a light-dark boundary HDG. The headlight lens 2 comprises a lens body 3 made of a transparent plastic, e.g. PMMA, which comprises a surface 5 facing towards the light source 10 and a surface 4 with a convex curvature facing away from the light source 10. The headlight lens 2 additionally comprises e.g. a non-optically active rim 6, by which the headlight lens 2 can be fastened in the vehicle headlight 1 or the headlight housing (not shown).

Figure 3:
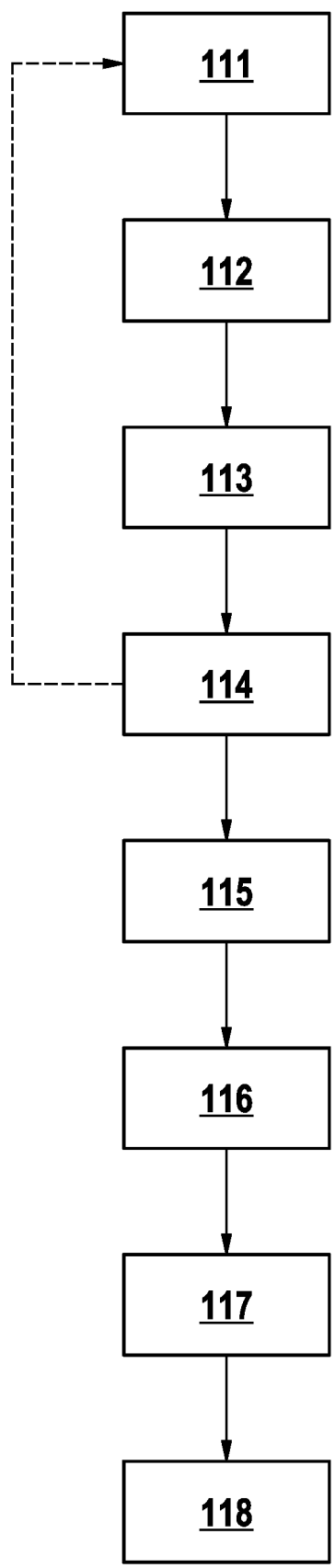
FIG. 3 shows an exemplary embodiment of a method of producing an automotive lens element.
Figure 4A:
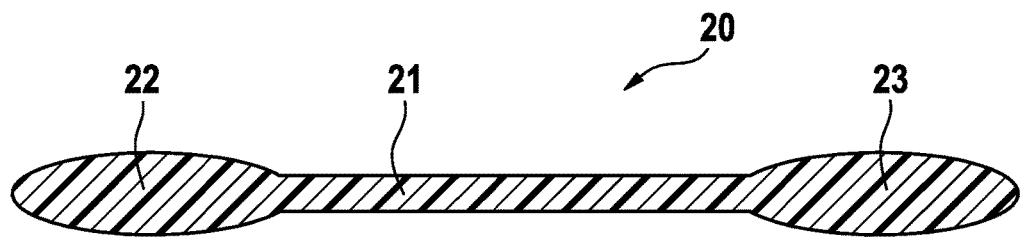
FIG. 4A shows an exemplary embodiment of a premolded part.

FIG. 3 describes an exemplary embodiment of a method of producing an automotive lens element. In a step 111, a pre-molded part 20 as illustrated in FIG. 4A is injection pressed (injection molded). In FIG. 4A, reference number 21 denotes a sprue/runner/gate and reference numbers 22 and 23 each denote a preform.

The pre-molded part 20 is cooled in a step 112 in the injection press mold (injection mold) and then removed in a step 113 and transported to a cooling station or a store (likewise a cooling station) outside the injection press mold (injection mold).

Figure 4B:
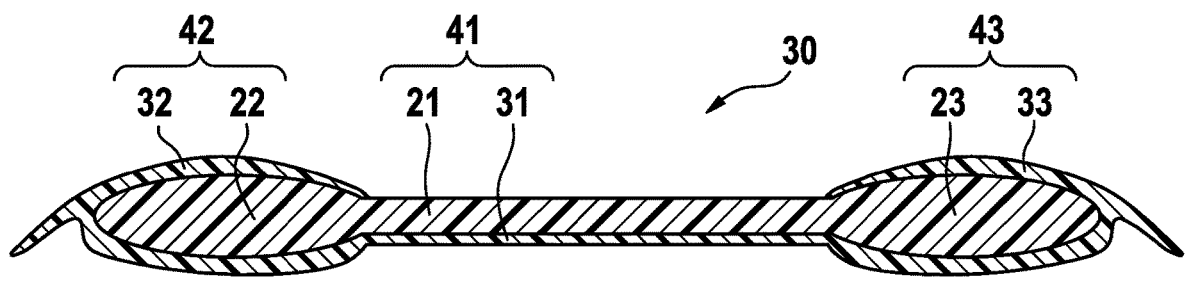
FIG. 4B shows an exemplary embodiment of an injection-molded part.
Figure 4C:
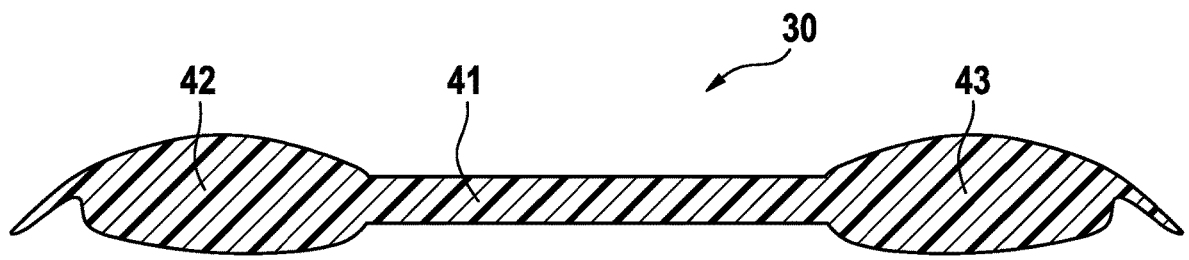
FIG. 4C shows the injection-molded part according to FIG. 4B after joining the injection pressing material (injection-molding material) from the two pressing steps.
Figure 4D:
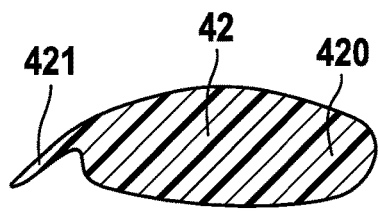
FIG. 4D shows separated automotive lens elements.
Figure 4D:
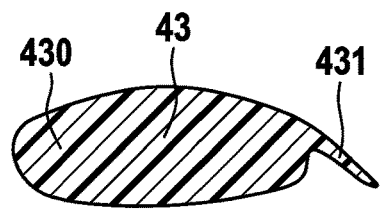
Figure 5:
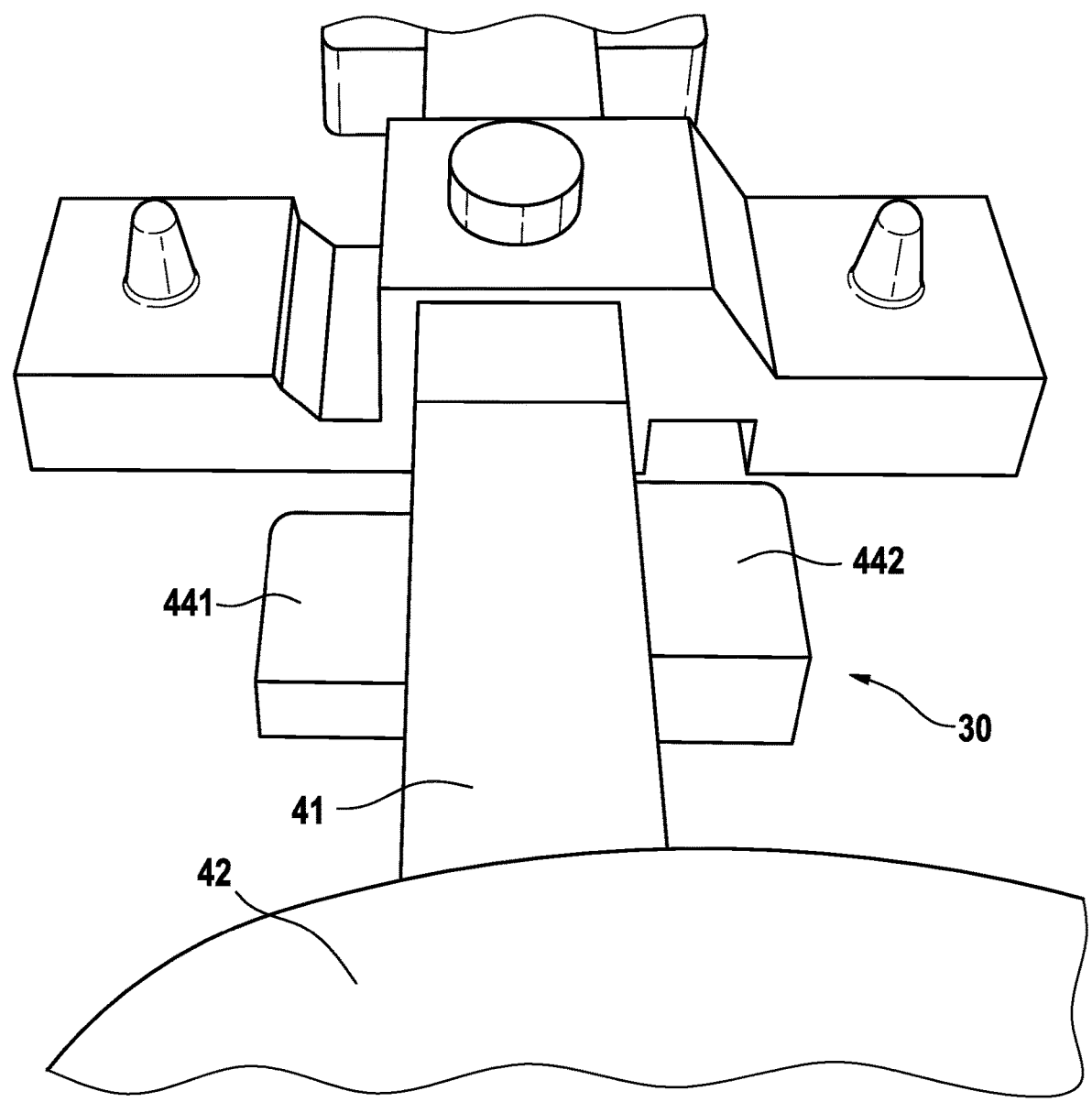
FIG. 5 shows a perspective view of a section of an exemplary embodiment of an injection-molded part.
Figure 6:
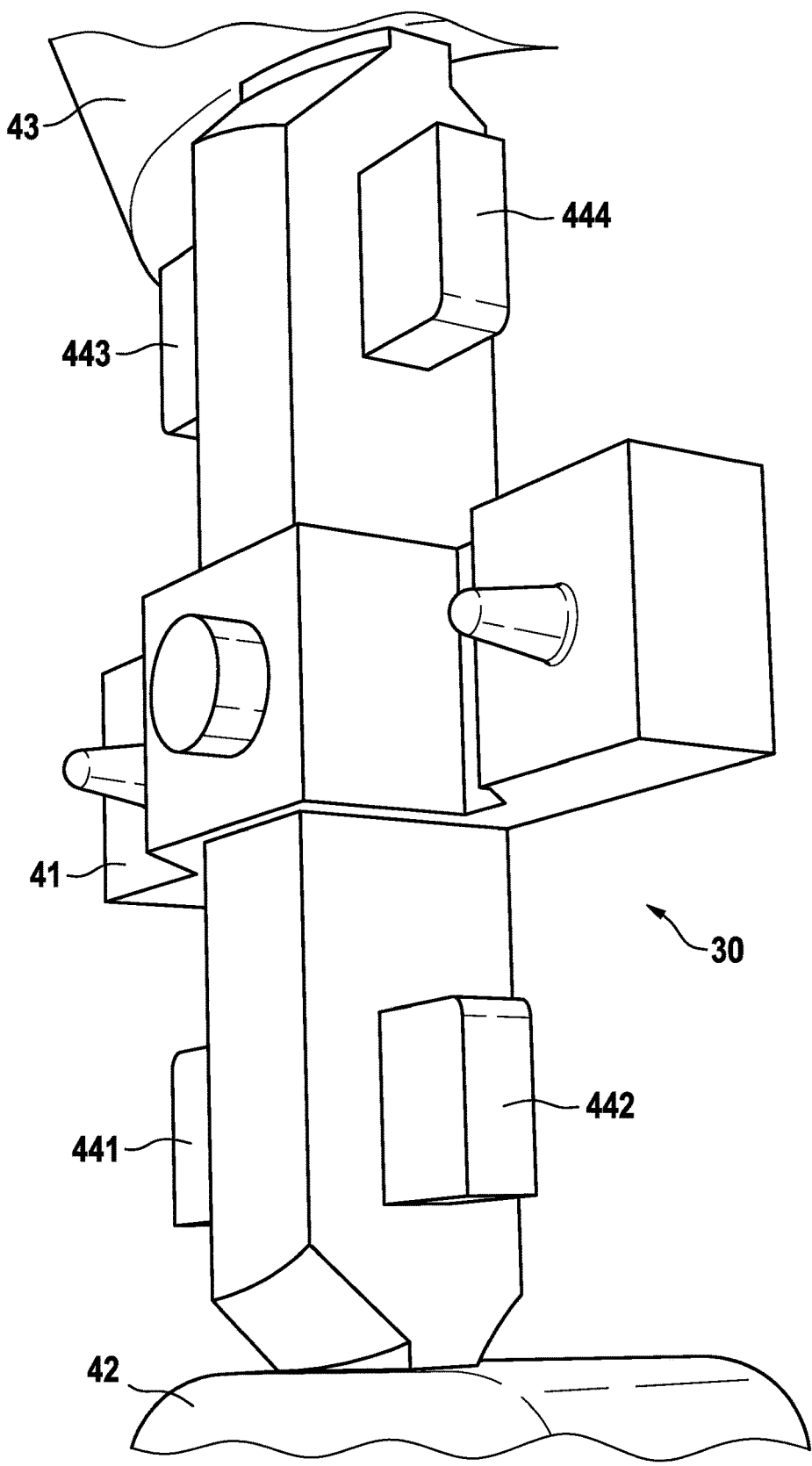
FIG. 6 shows a further perspective view of a section of the exemplary embodiment of an injection-molded part according to FIG. 5.
Figure 7:
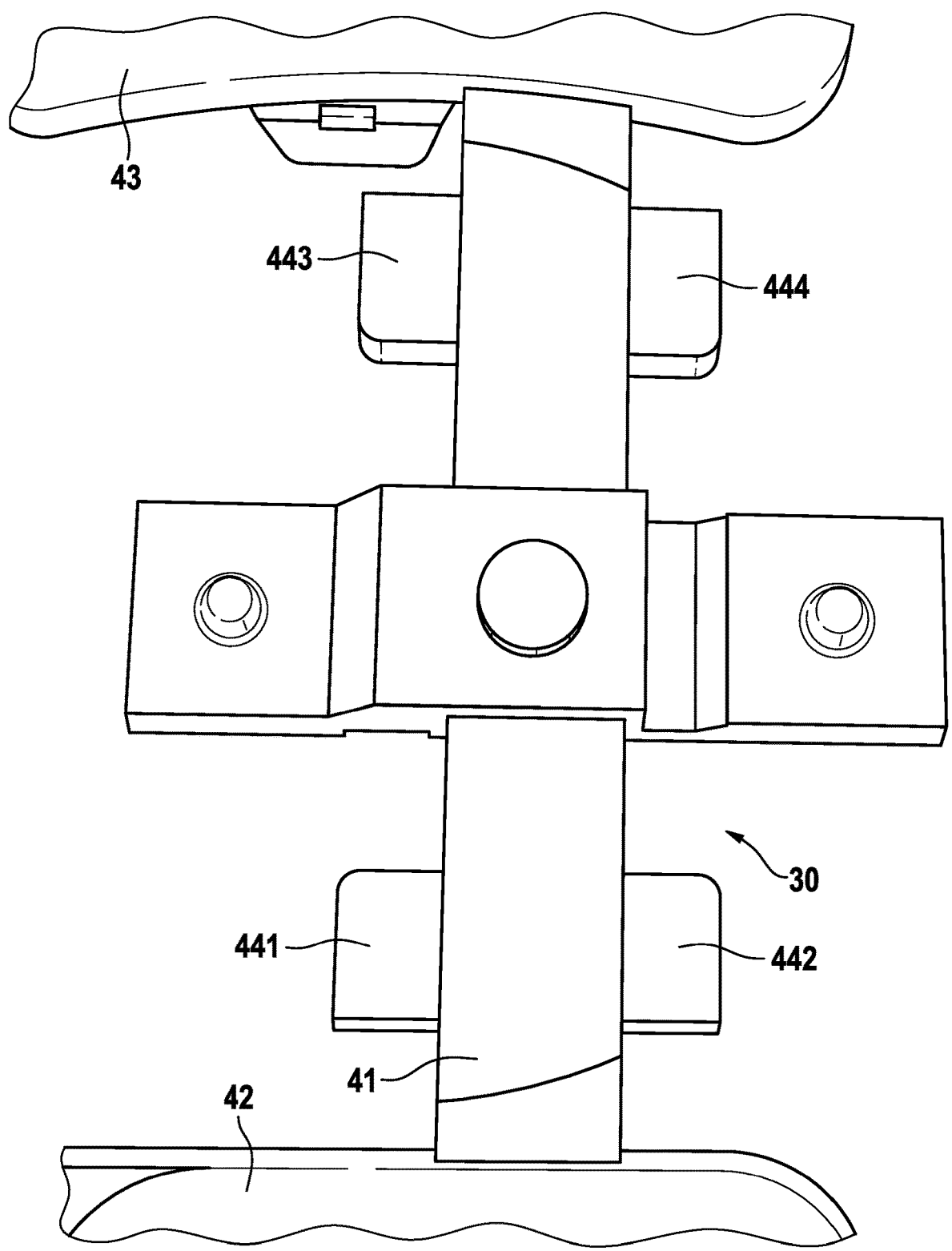
FIG. 7 shows a further perspective view of a section of the exemplary embodiment of an injection-molded part according to FIG. 5.
Figure 8:
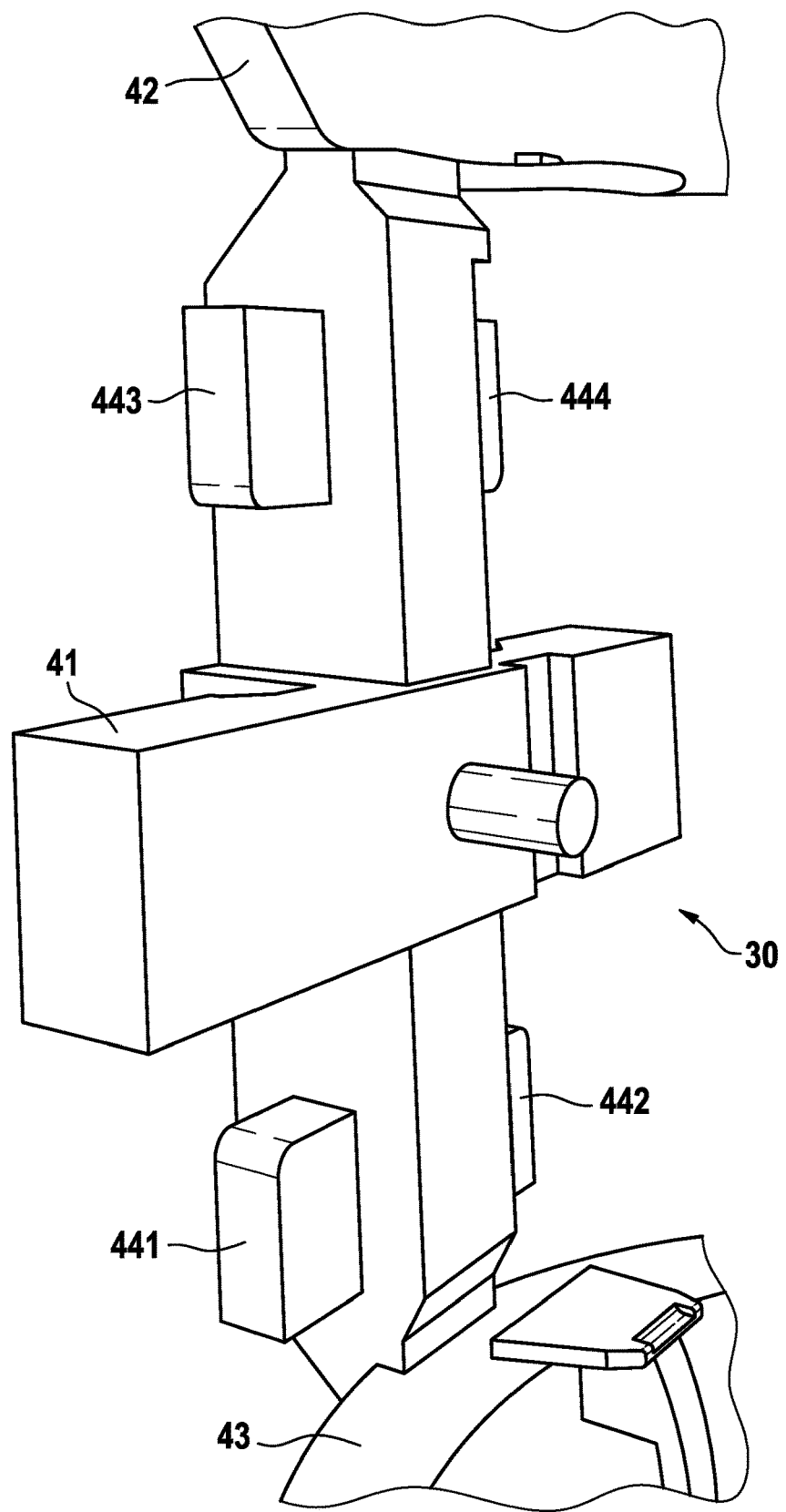
FIG. 8 shows the injection-molded part according to FIG. 5 in a view from below.

A step 114 follows, in which the pre-molded part 20 is arranged in a second injection press mold. There follows an injection pressing step similar to the injection step 111 or an injection pressing step 115 in which the pre-molded part 20 as illustrated in FIG. 4B is injection pressed to form an injection-molded part 30. In FIGS. 4A and 4B, reference number 21 denotes the sprue/runner/gate of the pre-molded part 20 (see above) and reference number 31 according to FIG. 4B denotes the additional sprue/runner/gate, with the two sprue/runner/gates 21 and 31 forming an overall sprue/runner/gate labelled with reference number 41 in FIG. 4B. In FIG. 4B, reference number 32 denotes injection pressing material for overmolding the preform 22 to form an (automotive) lens element 42, and reference number 33 denotes injection-molding material for overmolding the preform 23 to form an (automotive) lens element 43. FIG. 4C shows an injection-molded part in a schematic sketch or a schematic-type sketch, wherein the injection-molded part comprises the (automotive) lens elements 42 and 43 and the overall sprue/runner/gate 41, in which the injection-molding material from the (two) injection pressing steps has been combined. The (automotive) lens element 42 comprises a lens body 420 and an rim 421. The (automotive) lens element 43 comprises an optically active lens body 430 and an rim 431. FIG. 5, FIG. 6, FIG. 7 and FIG. 8 show a specific exemplary embodiment of an injection-molded part. The blind extensions labelled with reference numbers 441, 442, 443, 444 can also be omitted here.

Step 115 is followed by a step 116, in which the injection-molded part is cooled, and then by a step 117, in which the injection-molded part is removed from the injection press mold and further cooled. A step 118 follows, in which the overall sprue/runner/gate 41 is divided from the (automotive) lens elements 42 and 43 so that (automotive) lens elements 42 and 43 are separated. The (automotive) lens elements 42 and/or 43 can be used instead of the headlight lens 2.

Figure 9:
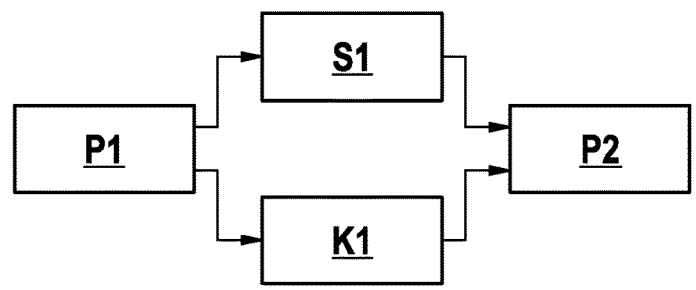
FIG. 9 shows a schematic view of a device for implementing the production method described with reference to FIG. 3.

FIG. 9 shows a schematic view of a device for implementing the production method described with reference to FIG. 3. P1 here denotes an injection press (injection-molding machine) for producing a pre-molded part 20. S1 denotes a store and K1 denotes a cooling system. The cooling system K1 serves to deliver the pre-molded part 20 to the injection press (injection-molding machine) P2 at a suitable temperature for producing the injection-molded part 30. In addition, individual pre-molded parts are phased into the store S1, so that it holds a reserve of e.g. a day's production of pre-molded parts. In this way, tool changes and interruptions can be compensated by decoupling the processes that are carried out on the injection presses (injection-molding machines) P1 and P2 with simultaneous linking. In this way, tool changes and maintenance operations involving the injection presses P1 and P2 do not have to be synchronized. If, for example, the injection press P2 is not taking any pre-molded parts 20, these are placed in the store S1. If the cooling section K1 is empty, a handling robot removes the pre-molded parts from the store S1 and delivers them to the injection press (injection-molding machine) P2.

Figure 10:
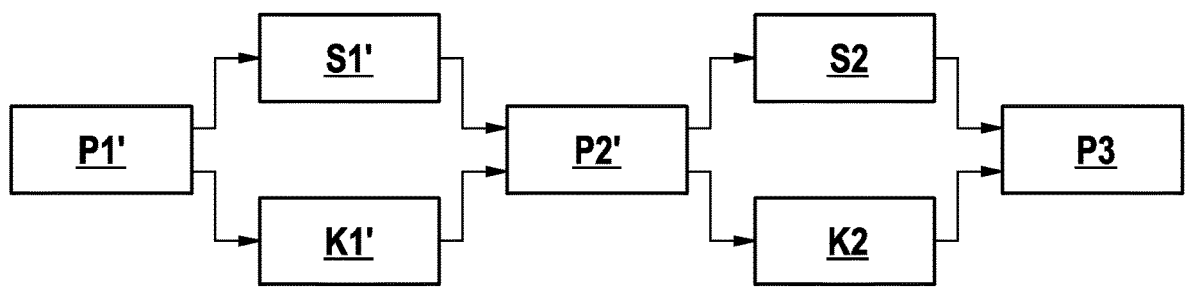
FIG. 10 shows a chain of three injection presses (injection-molding machines)

This method or architecture is particularly suitable where three injection presses (injection-molding machines) are linked together, as shown in FIG. 10. Here, the injection presses (injection-molding machines) P1' and P2' as well as P3 are linked together by way of the cooling systems K1' and K2, but at the same time can be decoupled without affecting the production of the other injection presses (injection-molding machines) P1', P2' or P3. For this decoupling, a store S1' and a store S2 are provided.

Figure 11:
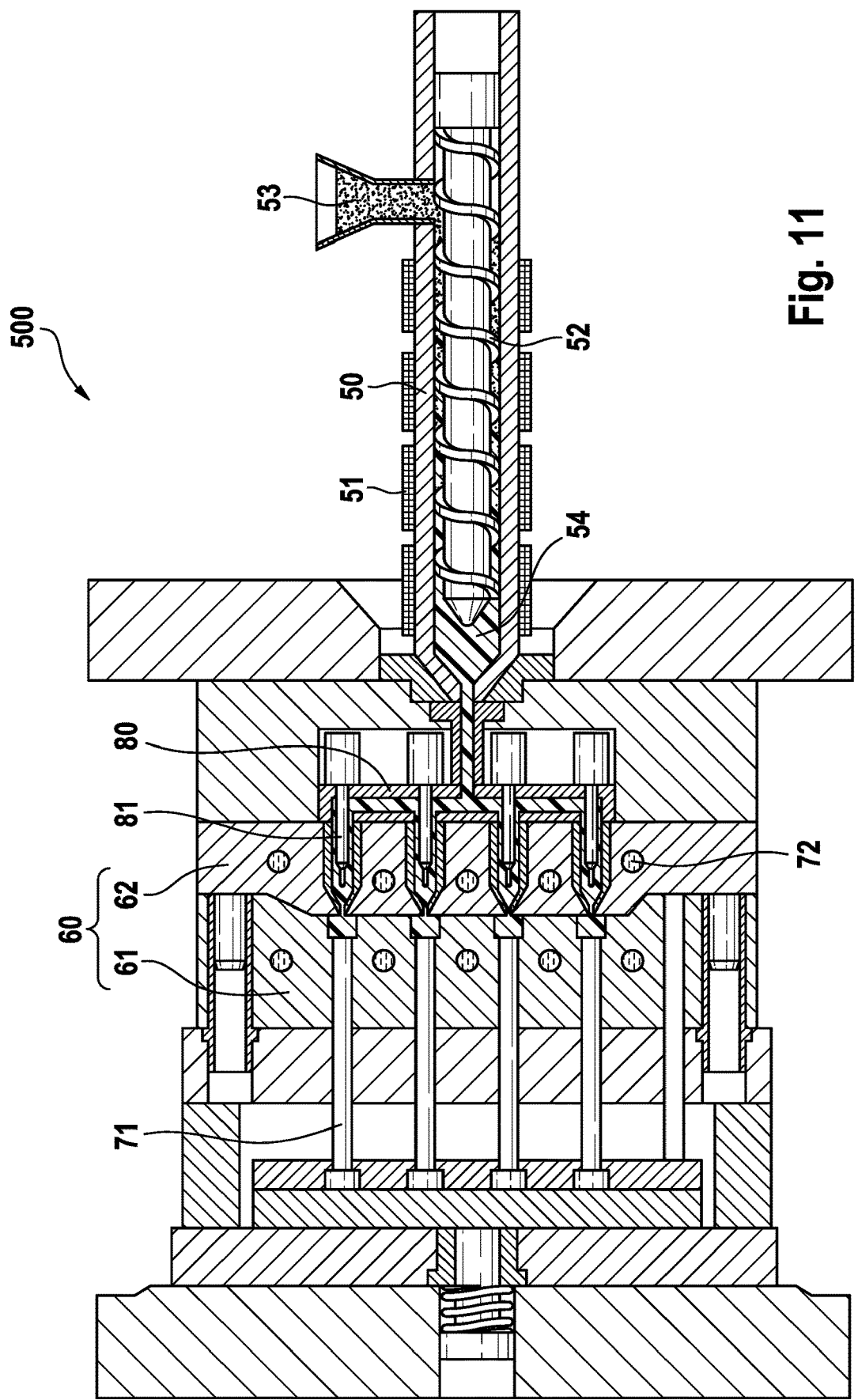
FIG. 11 shows an exemplary embodiment of an injection-molding machine in a basic cross-sectional representation.

FIG. 11 shows an exemplary embodiment of an injection-molding machine 500 by way of example, for use as an injection-molding machine P1, P1', P2, P2' or P3. The injection-molding machine 500 comprises an injection-molding unit 50 with a screw 52 and a heating system 51 for liquefying plastic, which is introduced into a material feed system 53 in the form of pellets. The plastic that has been liquefied by the heating system 51 is labelled with reference number 54.

The liquefied plastic 54 is then pressed into a hot runner system 80 and from there it is injected via hot runner nozzles 81 into an injection-molding tool 60. The injection-molding tool 60 comprises two mold parts 61 and 62, which can be moved apart for removing the pre-molded part or the injection-molded part, depending on what is being produced. Reference number 72 denotes cooling channels in the injection-molding tool 60.

Figure 12:
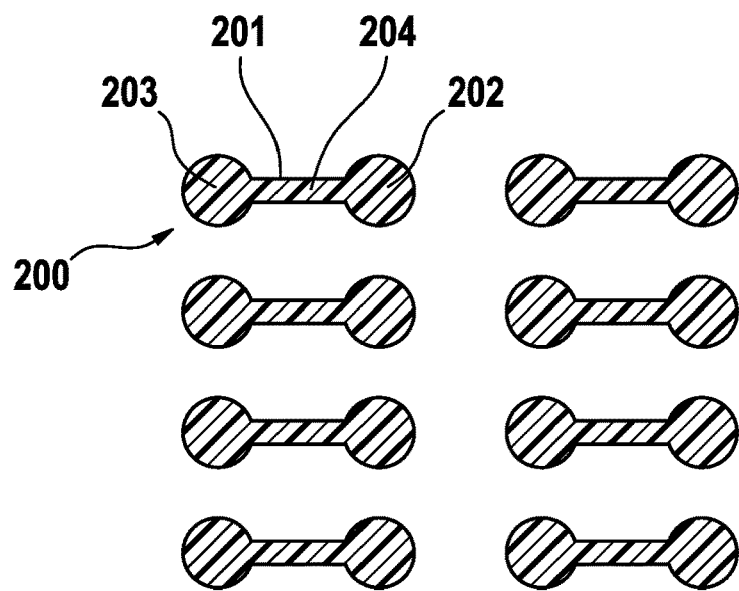
FIG. 12 shows an exemplary embodiment of the basic arrangement of pre-molded parts in a tool of an injection-molding machine.
Figure 13:
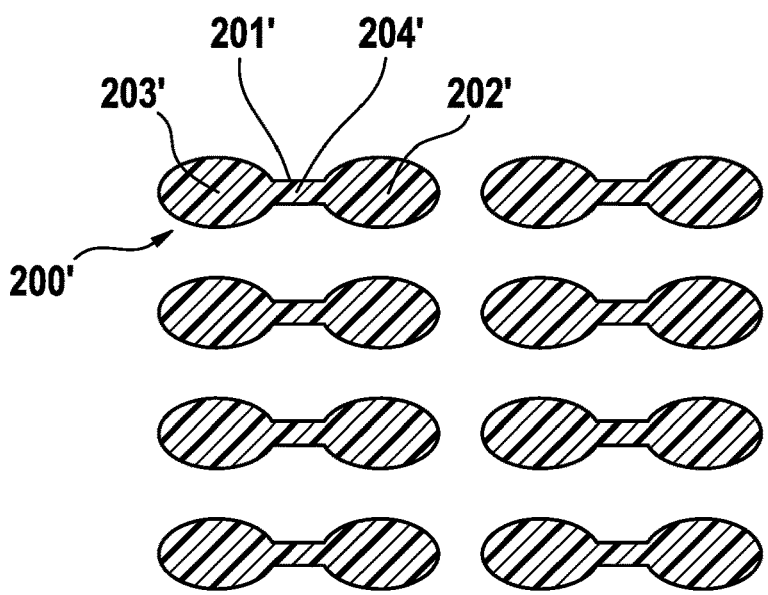
FIG. 13 shows a further exemplary embodiment of the basic arrangement of pre-molded parts in a tool of an injection-molding machine.

In the present exemplary embodiment, pre-molded parts are pressed, and specifically eight in a pressing step, as shown by way of example in FIG. 12. Reference number 200 here denotes a pre-molded part with two preforms 202 and 203, which are connected to a sprue/runner/gate 201, and 204 denotes the injection point for the pre-molded part 200. Reference number 71 in FIG. 11 denotes an ejector, which is provided to push on the preforms 202 and 203 so that these are ejected from the mold part 61. The schematic diagram in FIG. 12 shows the pre-molded parts 200 as viewed from the mold part 62 towards the mold part 61. The ejector 71, like the other ejectors illustrated, is raised from the cross-sectional area of the illustration in FIG. 11, so that it engages not on the sprue/runner/gate 201, as may appear purely from the drawing, but rather on the preforms 202 and 203. Injection-molded parts are also produced in a similar way. It is particularly optionally provided that, in the event of a change to the injection-molded part or the preform to be injection molded, a new tool for injection molding another pre-molded part is provided with an identical hot runner system. In other words, the injection point 204 for the pre-molded part 200 is at the same position as the injection point 204' of the preform 200' shown in FIG. 13. The pre-molded part 200' here comprises two preforms 202' and 203', which are joined together by way of a sprue/runner/gate 201'.

Figure 14:
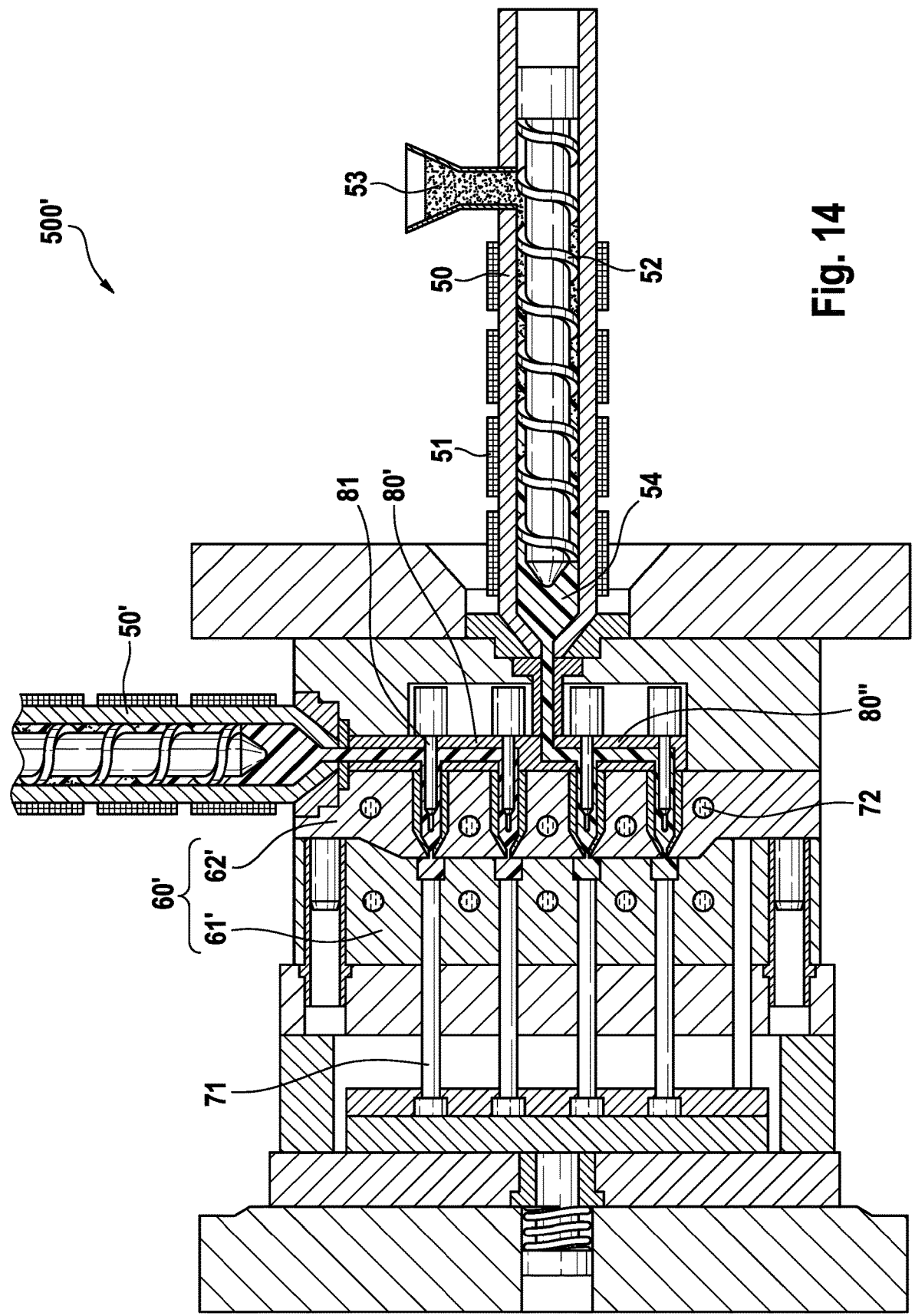
FIG. 14 shows a further exemplary embodiment of an injection-molding machine in a basic cross-sectional representation.

To produce injection-molded parts, for example an injection-molding machine 500' as shown in FIG. 14 can be used, which is modified compared to the injection-molding machine 500. The same reference numbers as in FIG. 11 denote similar or identical elements. The injection-molding tool denoted with reference number 60' of the injection-molding machine 500' comprises two mold parts 61' and 62'. In contrast to the injection-molding machine 500, the injection-molding machine 500' has two hot runner systems 80' and 80". The hot runner system 80" is supplied with liquid plastic by the injection molding unit 50 and the hot runner system 80' is supplied by an injection molding unit 50'. It can be provided that the pre-molded parts and the injection-molded parts are injection molded in an injection-molding machine such as the injection-molding machine 500'. It can be provided in this case that the hot runner system 80" supplies or fills the injection molds of the injection-molding tool 60' that are used for the injection molding of preforms with liquid plastic. The preforms are demolded after injection molding and cooled in the/a cooling system K1 or the/a store S1. After sufficient cooling, the preforms are inserted in the injection molds of the injection-molding tool 60' of the injection-molding machine 500' that are assigned to the hot runner system 80'. In these injection molds, to which the hot runner system 80' is assigned, the preforms are overmolded to form injection-molded parts.

The method of the present disclosure is used e.g. in the production of headlight lenses for projection headlights, which are also known as PES headlights (cf. e.g. Bosch—Automotive Handbook, 9th edition, ISBN 978-1-119-03294-6 (incorporated by reference in its entirety), pages 1044 and 1045 (incorporated by reference in its entirety)). However, the invention can also be used e.g. in conjunction with secondary lenses for matrix light or with respect to a primary optic for matrix light (see above). The invention can additionally be used e.g. for producing the lens described in WO 2018/019397 A1.

The method of the present disclosure can also be employed for producing headlight lenses according to WO 2014/114309 A1, WO 2014/114308 A1, WO 2014/114307 A1, WO 2014/072003 A1, WO 2013/178311 A1, WO 2013/170923 A1, WO 2013/068063 A1, WO 2013/068053 A1, WO 2012/146328 A1, WO 2012/072188 A1, WO 2012/072189 A2, WO 2012/072190 A2, WO 2012/072191 A2, WO 2012/072192 A1 and/or WO 2012/072193 A2.

The method of the present disclosure can also be described by the following sentences: Sentence 1: a method of producing an optical (automotive) lens element (2), for example for illumination purposes, for example of producing a headlight lens (2) for a vehicle headlight, for example for a motor vehicle headlight (1), wherein injection-molding material (transparent plastic liquefied by heating) is injection molded using a first injection mold to form a pre-molded part (20), which comprises at least one preform (22) and at least a first sprue/runner/gate (21) connected to the preform, wherein the pre-molded part (20) is then cooled outside the first injection mold, and wherein the pre-molded part (20) is then injection molded and/or overmolded in a second injection mold to form an injection-molded part (30) that comprises at least one optical (automotive) lens element (42) and at least a second sprue/runner/gate (31, 41) or an overall sprue/runner/gate formed from the first sprue/runner/gate and the second sprue/runner/gate. Sentence 2: the method according to sentence 1, wherein the optical (automotive) lens element (42) comprises an optically active lens body (420) and a non-optically active rim (421), wherein the second sprue/runner/gate (31, 41) is directly connected to the optical lens body (420). Sentence 3: the method according to sentence 1 or 2, wherein the second sprue/runner/gate (31) runs at least in part along the first sprue/runner/gate (21). Sentence 4: the method according to sentence 1, 2 or 3, wherein the pre-molded part (20) comprises at least a second preform (43), wherein the at least first sprue/runner/gate (21) connects the first preform (22) to the second preform (23). Sentence 5: the method according to one of the preceding sentences, wherein the injection-molded part (30) comprises at least a second optical (automotive) lens element (43), wherein the at least second sprue/runner/gate (31) or the overall sprue/runner/gate (41) connects the first optical (automotive) lens element (42) to the second optical (automotive) lens element (43). Sentence 6: the method according to one of the preceding sentences, wherein the non-optically active rim (421) is shaped only when the injection-molded part (30) is injection molded. Sentence 7: the method according to one of the preceding sentences, wherein during cooling of the injection-molded part (30) this is held only by the second sprue/runner/gate (31) or by the overall sprue/runner/gate (41). Sentence 8: the method according to one of the preceding sentences, wherein the second sprue/runner/gate (31) runs for the greatest part along the first sprue/runner/gate (21). Sentence 9: the method according to one of the preceding sentences, wherein the pre-molded part (20) is cooled in either a first cooling station (S1) or a second cooling station (K1). Sentence 10: the method according to one of the preceding sentences, wherein the volume of the first sprue/runner/gate amounts to at least 30% of the pre-molded part. Sentence 11:

the method according to one of the preceding sentences0, wherein the volume of the second sprue/runner/gate amounts to at least 30% of the injection-molded part. Sentence 12: the method according to one of the preceding sentences1, wherein the first sprue/runner/gate (21) comprises a cross-sectional area of at least 25 mm². Sentence 13: the method according to one of the preceding sentences2, wherein the second sprue/runner/gate (31) comprises a cross-sectional area of at least 25 mm². Sentence 14: the method according to one of the preceding claims, wherein the first optical (automotive) lens element is divided from the overall sprue/runner/gate (41). Sentence 15: the method according to sentence 14, wherein the second optical (automotive) lens element is divided from the second sprue/runner/gate (31, 41). Sentence 16: a method of producing a vehicle headlight (1), wherein an optical (automotive) lens element (42, 43) produced by a method according to sentence 14 or 15 is installed in a headlight housing. Sentence 17: a method of producing a vehicle headlight (1), wherein an optical (automotive) lens element (42, 43) produced by a method according to sentence 14 or 15 is placed in a headlight housing and installed together with at least one light source (10) to form a vehicle headlight (1). Sentence 18: a method of producing a vehicle headlight (1), wherein an optical (automotive) lens element (42, 43) produced by a method according to sentence 14 or 15 is installed (in a headlight housing) together with at least one light source (10) and a shield (15) to form a vehicle headlight (1) in such a way that an rim (15) of the shield (14) can be imaged by the (automotive) lens element (42), using light emitted by the light source (10), as a light-dark boundary (HDG). Sentence 19: a method of producing a motor vehicle (100), wherein a vehicle headlight (1) produced according to sentence 16, 17 or 18 is installed in the front of the motor vehicle (100). Sentence 20: a method of producing a motor vehicle (100), wherein a vehicle headlight (1) produced according to sentence 18 is installed in the front of the motor vehicle (100) in such a way that the light-dark boundary (HDG) can be imaged on a road on which the motor vehicle (100) can be arranged.

LIST OF REFERENCE SIGNS

1 Vehicle headlight
2 Headlight lens
3 Lens body
4 Surface with convex curvature
5 A surface facing a light source
6 Rim
10 Light source
12 Reflector
14 Shield
15 Rim of a shield
20 Pre-molded part
21 (First) sprue/runner/gate
22, 23 Preform
30 Injection-molded part
31 (Second or additional) sprue/runner/gate
32, 33 Injection-molding material/injection-pressing material for overmolding a preform
41 Sprue/runner/gate or overall sprue/runner/gate
42, 43 Injection-molded elements or (automotive) lens elements
50, 50' Injection-molding unit
51 Heating system
52 Screw
53 Material supply
54 Liquefied plastic
60, 60' Injection-molding tool
61, 62, 61', 62' Mold part
71 Ejector
72 Cooling channel
80, 80', 80" Hot runner system
81 Hot runner nozzle
100 Motor vehicle
111, 112, 113, 114,
115, 116, 117, 118 Step
200, 200' Pre-molded part
201, 201' Sprue/runner/gate
202, 202', 203, 203' Preform
204, 204' Injection point
420, 430 Lens body
421, 431 Rim of an automotive lens element
441, 442, 443, 444 Blind extensions
500, 500' Injection-molding machine
P1, P1', P2, P2', P3 Injection press (injection-molding machine)
K1, K1', K2 Cooling system
S1, S1', S2 Store
HDG Light-dark boundary

What is claimed is:

1. A method of producing an optical lens element, the method comprising:
   injection molding an injection-molding material into a first injection mold to form a pre-molded part comprising at least a first preform and at least a first sprue connected to the at least first preform, wherein the injection-molding material is a liquefied transparent plastic;
   cooling the pre-molded part outside the first injection mold; and
   overmolding the at least first preform including the first sprue still connected to the at least first preform, using a second injection mold to form an injection-molded part comprising at least the optical lens element and a second sprue, wherein the first sprue and the second sprue form an overall sprue, wherein the first sprue forms a partial wall of the cavity for the second sprue.

2. The method of claim 1, wherein the first optical lens element comprises an optically active lens body and a non-optically active rim, wherein the second sprue is connected directly to the optically active lens body.

3. The method of claim 1, wherein the first optical lens element comprises an optically active lens body and a non-optically active rim, wherein the second sprue is connected directly to the optically active lens body and not indirectly via the non-optically active rim.

4. The method of claim 1, wherein the first optical lens element comprises an optically active lens body and a non-optically active rim molded by means of the second injection mold, wherein the second sprue is connected directly to the optically active lens body.

5. The method of claim 4, wherein the first pre-molded part comprises at least a second preform, and wherein the at least first sprue connects the first preform to the second preform.

6. The method of claim 5, wherein the injection-molded part comprises at least a second optical lens element, and wherein the overall sprue connects the first optical lens element to the second optical lens element.

7. The method of claim 5, wherein the injection-molded part comprises at least a second optical lens element, wherein the at least second sprue connects the first optical lens element to the second optical lens element.

8. The method of claim 4, the method further comprising:
cooling the first injection-molded part outside the second injection mold, wherein the first injection-molded part is held only by the overall sprue during cooling.

9. The method of claim 4, the method further comprising:
cooling the first injection-molded part outside the second injection mold, wherein the first injection-molded part is held only by the second sprue during cooling.

10. The method of claim 4, wherein a major part of the second sprue runs along the first sprue.

11. The method of claim 4, wherein the non-optically active rim is shaped only when the injection-molded part is injection molded.

12. The method of claim 1, the method further comprising:
cooling the first injection-molded part outside the second injection mold, wherein the first injection-molded part is held only by the overall sprue during cooling.

13. The method of claim 1, wherein a major part of the second sprue runs along the first sprue.

\* \* \* \* \*